United States Patent
Matsui et al.

(10) Patent No.: US 9,269,281 B2
(45) Date of Patent: Feb. 23, 2016

(54) REMOTE SCREEN CONTROL DEVICE, REMOTE SCREEN CONTROL METHOD, AND RECORDING MEDIUM

(75) Inventors: Kazuki Matsui, Kawasaki (JP); Kenichi Horio, Yokohama (JP); Ryo Miyamoto, Kawasaki (JP); Tomoharu Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 310 days.

(21) Appl. No.: 13/618,660

(22) Filed: Sep. 14, 2012

(65) Prior Publication Data

US 2013/0135337 A1  May 30, 2013

(30) Foreign Application Priority Data

Nov. 30, 2011  (JP) ................. 2011-263063

(51) Int. Cl.
*G09F 5/02* (2006.01)
*G06F 3/14* (2006.01)

(52) U.S. Cl.
CPC .............. *G09F 5/02* (2013.01); *G06F 3/1462* (2013.01); *G09G 2340/02* (2013.01); *G09G 2340/06* (2013.01); *G09G 2360/122* (2013.01); *G09G 2370/022* (2013.01)

(58) Field of Classification Search
None
See application file for complete search history.

(56) References Cited

U.S. PATENT DOCUMENTS

| | | | | |
|---|---|---|---|---|
| 6,973,130 B1 * | 12/2005 | Wee et al. | ................. | 375/240.16 |
| 7,882,172 B2 | 2/2011 | Kodaka et al. | | |
| 2010/0220111 A1 * | 9/2010 | Stauder et al. | ................. | 345/604 |

FOREIGN PATENT DOCUMENTS

JP  2007-311957  11/2007

* cited by examiner

*Primary Examiner* — Barry Drennan
*Assistant Examiner* — Diana Hickey
(74) *Attorney, Agent, or Firm* — Fujitsu Patent Center

(57) ABSTRACT

A server apparatus renders a process result of software on an image memory that stores a display image to be displayed on a client terminal, detects an update area in which an update occurs between frames of an image. The server apparatus selectively switches and performs a first generation process and a second generation process according to the number of detected update areas. The first generation process is a process that generates a color map for each update area based on colors used in the update area. The second generation process is a process that generates a color map commonly used between the update areas based on colors used in images of the update areas. The server apparatus reduces the number of colors in an update area using the generated color map and transmits a compressed image of the update area to the client terminal.

5 Claims, 11 Drawing Sheets

FIG.4
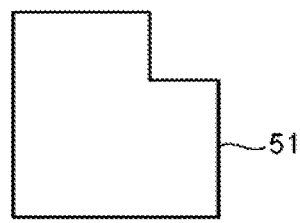
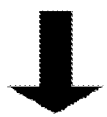
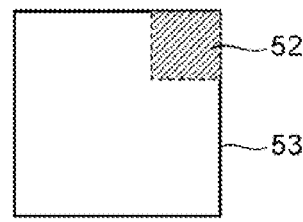
FIG.5
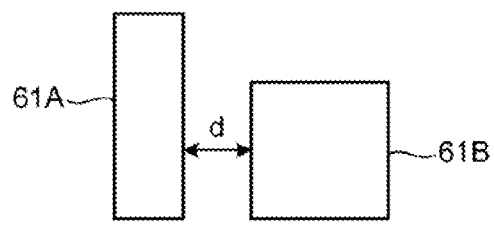
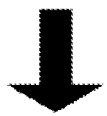
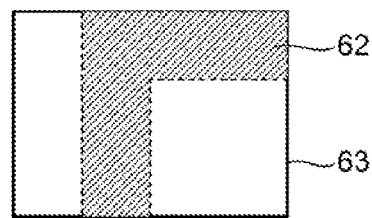

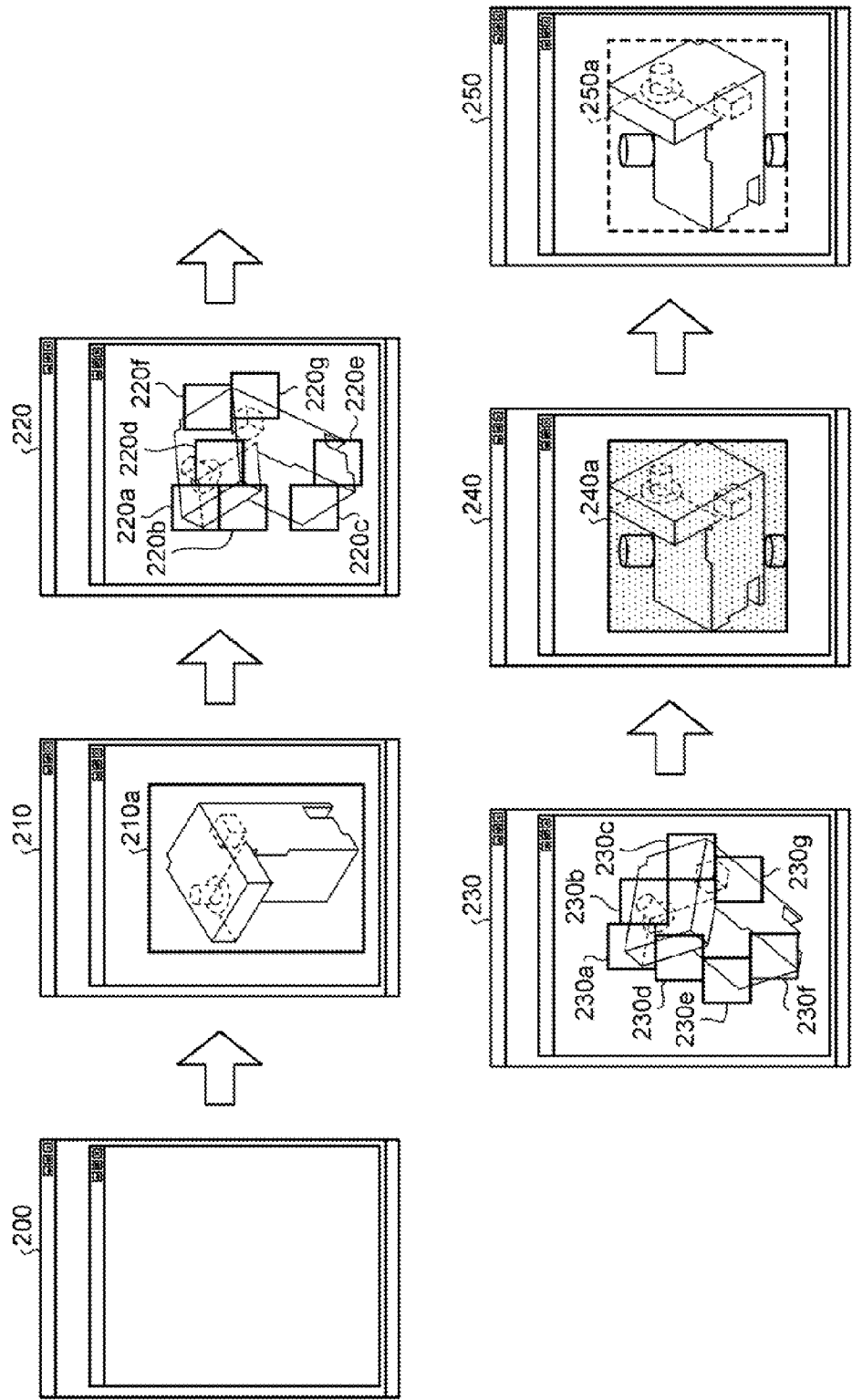

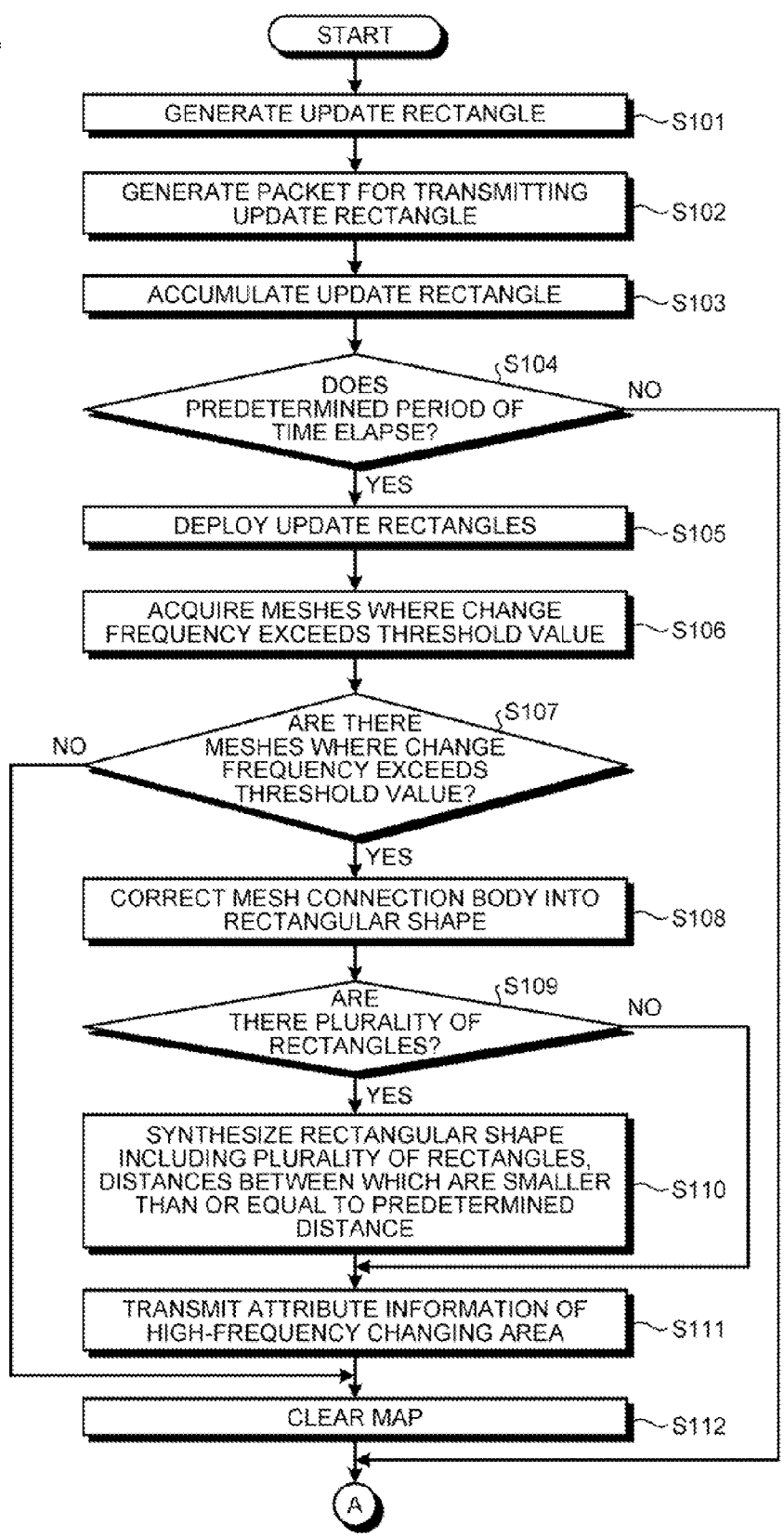

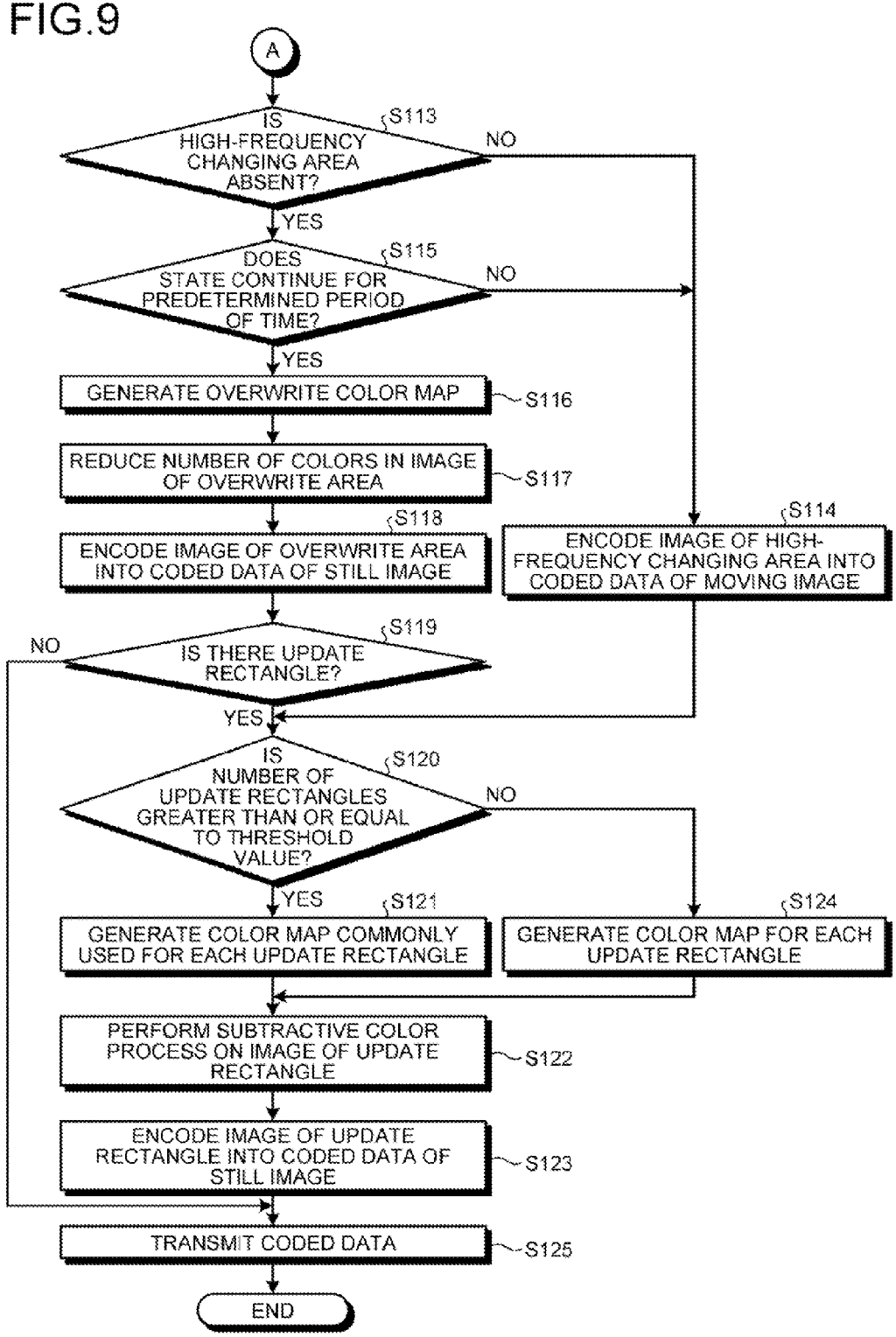

REMOTE SCREEN CONTROL DEVICE, REMOTE SCREEN CONTROL METHOD, AND RECORDING MEDIUM

CROSS-REFERENCE TO RELATED APPLICATION

This application is based upon and claims the benefit of priority of the prior Japanese Patent Application No. 2011-263063, filed on Nov. 30, 2011, the entire contents of which are incorporated herein by reference.

FIELD

The embodiments discussed herein are directed to an information processing apparatus, an image transmission method, and an image transmission program.

BACKGROUND

A system called a thin client is known. The thin client system is constructed so that a client has a minimum function and a server manages resources such as applications and files.

Although the thin client system causes the client to display a result of a process that is actually performed by the server and data held by the server, the thin client system behaves as if the client independently performed the process and held the data.

When the server transmits screen data to be displayed by the client, there may be a transmission delay due to network congestion between the server and the client. The screen data transmitted from the server is displayed late on the client due to the transmission delay on the network, so that response to an operation performed on the client deteriorates.

Therefore, to reduce the amount of data transmitted between the server and the client, a compression process is performed on block data in an updated screen among desktop screens to be displayed on the client. As an example of the compression process, compression coding is performed using a still image compression method, and further a subtractive color process for converting block data in a screen from 24-bit color, that is, so-called full color, to 16-bit color or 8-bit color is performed before the compression coding.
Patent Document 1: Japanese Laid-open Patent Publication No. 2007-311957

However, in the related technique described, the subtractive color process and the compression coding is performed for each block data in a screen, so that there is a problem that time for the compression process increases as the amount of transmitted data is reduced.

SUMMARY

According to an aspect of the embodiments, an information processing apparatus comprising: a memory; and a processor coupled to the memory, wherein the processor executes a process comprising: rendering a process result of software on an image memory that stores a display image to be displayed on a terminal apparatus connected via a network; detecting an update area in which an update occurs between frames of the image; selectively switching and performing a first generation process that generates a color map for each update area based on colors used in an image of the update area, and a second generation process that generates a color map commonly used between the update areas based on colors used in images of the update areas, according to the number of the detected update areas; reducing the number of colors in the update areas using the generated color map; and first transmitting a compressed image of update area to the terminal apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram for explaining a correction method of a mesh connection body;

FIG. 5 is a diagram for explaining a synthesis method of candidates of a high-frequency changing area;

FIG. 7 is a diagram illustrating a specific example for explaining transition of an original image used to generate a color map;

FIG. 8 is a flowchart (1) illustrating a procedure of an image transmission process according to the first embodiment;

FIG. 9 is a flowchart (2) illustrating a procedure of the image transmission process according to the first embodiment;

DESCRIPTION OF EMBODIMENTS

Preferred embodiments will be explained with reference to accompanying drawings. The embodiments do not limit disclosed techniques. The embodiments can be arbitrarily combined in a range in which processes do not conflict each other.

[a] First Embodiment

System Configuration

Figure 1:
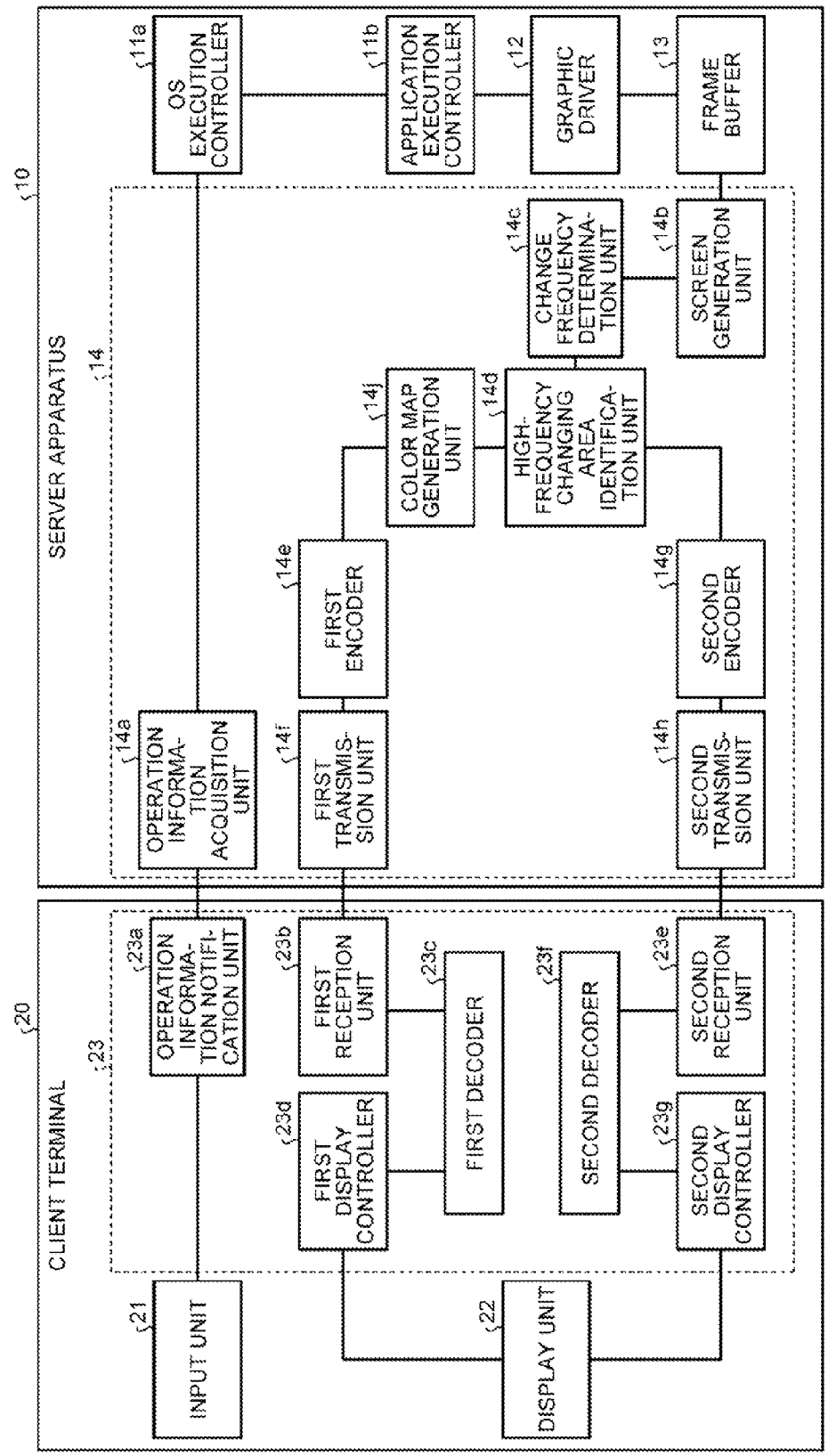
FIG. 1 is a block diagram illustrating a functional configuration of apparatuses included in a thin client system according to a first embodiment.

First, a configuration of a thin client system according to the present embodiment will be described. FIG. 1 is a block diagram illustrating a functional configuration of apparatuses included in a thin client system according to the first embodiment.

A thin client system 1 illustrated in FIG. 1 causes a server apparatus 10 to remotely control a desktop screen displayed by a client terminal 20. In other words, although the thin client system 1 causes the client terminal 20 to display a result of a process that is actually performed by the server apparatus 10 and data held by the server apparatus 10, the thin client system 1 behaves as if the client terminal 20 independently performed the process and held the data.

As illustrated in FIG. 1, the thin client system 1 includes the server apparatus 10 and the client terminal 20. Although the example of FIG. 1 illustrates a case in which one client terminal 20 is connected to one server apparatus 10, the present embodiment can be applied to a case in which any number of client terminals are connected to the server apparatus 10.

The server apparatus 10 and the client terminal 20 are communicably connected to each other through a predetermined network. As the network, it is possible to employ, whether wired or wireless, any types of communication networks such as the Internet, a LAN (Local Area Network), and a VPN (Virtual Private Network). It is assumed that, for example, an RFB (Remote Frame Buffer) protocol of VNC (Virtual Network Computing) is employed as a communication protocol between the server apparatus 10 and the client terminal 20.

The server apparatus 10 is a computer that provides a service to remotely control a screen displayed by the client terminal 20. An application for a server to remotely control a screen is installed or preinstalled in the server apparatus 10. Hereinafter, the application for a server to remotely control a screen may be referred to as "server side remote screen control application".

The server side remote screen control application has a function to provide a remote screen control service as a basic function. As an aspect, the server side remote screen control application acquires operation information of the client terminal 20 and then causes an application running on the server apparatus 10 to execute a process correspond to the operation. The server side remote screen control application generates a screen to display a result of the process executed by the application and then transmits the screen to the client terminal 20. At this time, the server side remote screen control application transmits an image of an area in which pixels of a portion where a bitmap image is changed from a bitmap image displayed by the client terminal 20 before generating the screen of this time are located, that is, an image of update rectangle. Although a case in which an image of updated portion is formed into a rectangle image will be described below, the disclosed apparatus can be applied to a case in which an image of updated portion is formed into a shape other than a rectangle.

Further, the server side remote screen control application has a function to compress data of a portion in which motion is large between frames into data of a compression method for moving image and transmit the data to the client terminal 20. As an aspect, the server side remote screen control application divides a desktop screen displayed by the client terminal 20 into a plurality of areas and monitors frequency of changes for each divided area. At this time, the server side remote screen control application transmits attribute information of an area where the frequency of changes exceeds a threshold value, that is, attribute information of a high-frequency changing area, to the client terminal 20. Based on this, the server side remote screen control application encodes the bitmap image of the high-frequency changing area into data of MPEG algorithm such as MPEG-2 or MPEG-4 and transmits the data to the client terminal 20. Although, here, a case in which the bitmap image is compressed into data of MPEG (Moving Picture Experts Group) algorithm is described as an example, it is not limited to this. For example, any moving image compression coding method, for example, Motion-JPEG (Joint Photographic Experts Group), can be employed.

The client terminal 20 is a computer that receives the remote screen control service of the server apparatus 10. As an example of the client terminal 20, in addition to a fixed terminal such as a PC (personal computer), a mobile terminal such as a mobile phone, a PHS (Personal Handyphone System), and a PDA (Personal Digital Assistant) can be employed. A remote screen control application for a client is installed or preinstalled in the client terminal 20. Hereinafter, the remote screen control application for a client may be referred to as "client side remote screen control application".

The client side remote screen control application has a function to transmit operation information received through various input devices such as a mouse and a keyboard to the server apparatus 10. As an aspect, the client side remote screen control application transmits operation information such as left and right clicks of the mouse, a double click, a drag, and an amount of movement of a mouse cursor obtained via a moving operation of the mouse. As another example, the client side remote screen control application also transmits operation information such as an amount of rotation of a mouse wheel and a type of a key pressed on the keyboard.

Further, the client side remote screen control application has a function to display an image received from the server apparatus 10 on a predetermined display unit. As an aspect, when the client side remote screen control application receives a bitmap image of update rectangle from the server apparatus 10, the client side remote screen control application displays the image of update rectangle at a position where an image is changed from the previous bitmap image. As another aspect, when the client side remote screen control application receives attribute information of a high-frequency changing area the client side remote screen control application defines an area on the display screen corresponding to a position included in the attribute information as a blank area where no bitmap image is displayed. In addition, when the client side remote screen control application receives data compressed by a moving image compression method, the client side remote screen control application decodes the data and displays the decoded data in the blank area.

Configuration of Server Apparatus

Next, a functional configuration of the server apparatus according to the present embodiment will be described. As illustrated in FIG. 1, the server apparatus 10 includes an OS execution controller 11a, an application execution controller 11b, a graphic driver 12, a frame buffer 13, and a remote screen controller 14. In addition to the functional components illustrated in FIG. 1, the example of FIG. 1 includes various functional components included in a known computer, such as functions of various input devices and a display device.

The OS execution controller 11a is a processing unit that controls execution of the OS (Operating System). As an aspect, the OS execution controller 11a detects a start instruction of an application and a command to an application from operation information acquired by an operation information acquisition unit 14a described later. For example, when the OS execution controller 11a detects a double click on an icon of an application, the OS execution controller 11a instructs the application execution controller 11b described later to start the application corresponding to the icon. Further, when the OS execution controller 11a detects an operation requesting execution of a command on an operation screen of a running application, that is to say, on a window, the OS execution controller 11a instructs the application execution controller 11b to execute the command.

The application execution controller 11b is a processing unit that controls execution of an application based on an instruction from the OS execution controller 11a. As an aspect, when the application execution controller 11b is instructed by the OS execution controller 11a to start an application or to execute a command in a running application, the application execution controller 11b activates the application. The application execution controller 11b requests the graphic driver 12 described later to render a display image of a process result obtained by executing the application in the frame buffer 13. When the application execution controller 11b requests the graphic driver 12 to render an image, the application execution controller 11b transmits a display image and a rendering position of the display image to the graphic driver 12.

The application executed by the application execution controller 11b may be preinstalled or may be installed after the shipment of the server apparatus 10. The application may be an application running on a network environment such as JAVA (registered trademark).

The graphic driver 12 is a processing unit that performs a rendering process on the frame buffer 13. As an aspect, when the graphic driver 12 receives a rendering request from the application execution controller 11b, the graphic driver 12 renders the display image of the process result of the application to the rendering position on the frame buffer 13 specified by the application in a bitmap format. Although, here, a case in which a rendering request is received via an application is described as an example, a rendering request from the OS execution controller 11a can be received. For example, when the graphic driver 12 receives a rendering request of a mouse cursor from the OS execution controller 11a, the graphic driver 12 renders a display image of the mouse cursor to the rendering position on the frame buffer 13 specified by the OS in a bitmap format.

The frame buffer 13 is a storage device for storing the bitmap image rendered by the graphic driver 12. An aspect of the frame buffer 13 is a semiconductor memory device such as RAM (Random Access Memory) including VRAM (Video Random Access Memory), ROM (Read Only Memory), and flash memory. As the frame buffer 13, a storage device such as a hard disk and an optical disk may be employed.

The remote screen controller 14 is a processing unit that provides a remote screen control service to the client terminal 20 through the server side remote screen control application. As illustrated in FIG. 1, the remote screen controller 14 includes the operation information acquisition unit 14a, a screen generation unit 14b, a change frequency determination unit 14c, and a high-frequency changing area identification unit 14d. Further, the remote screen controller 14 includes a first encoder 14e, a first transmission unit 14f, a second encoder 14g, a second transmission unit 14h, and a color map generation unit 14j.

The operation information acquisition unit 14a is a processing unit that acquires operation information from the client terminal 20. Examples of the operation information include left and right clicks of the mouse, a double click, a drag, and an amount of movement of a mouse cursor obtained via a moving operation of the mouse. Other examples of the operation information include an amount of rotation of a mouse wheel and a type of a key pressed on the keyboard.

The screen generation unit 14b is a processing unit that generates an image of a screen displayed on a display unit 22 of the client terminal 20. As an aspect, the screen generation unit 14b starts the process described below every time an update interval of the desktop screen, for example, 33 msec, elapses. The screen generation unit 14b compares a desktop screen displayed on the client terminal 20 when the previous frame is generated and a desktop screen written to the frame buffer 13 when the current frame is generated. Then, the screen generation unit 14b generates an image of update rectangle by combining pixels of a portion changed from the previous frame and forming the pixels into a rectangular shape and generates a packet for transmitting the update rectangle.

The change frequency determination unit 14c is a processing unit that determines the frequency of changes between frames for each divided area of desktop screen. As an example, the change frequency determination unit 14c accumulates an update rectangle generated by the screen generation unit 14b in an internal memory not illustrated in FIG. 1 for a predetermined period of time. At this time, the change frequency determination unit 14c accumulates attribute information capable of identifying the position and the size of the update rectangle, for example, the coordinates of the upper-left vertex of the update rectangle and the width and the height of the update rectangle. The period of time for which the update rectangle is accumulated is correlated with the accuracy of identifying the high-frequency changing area. The longer the period of time, the more the misdetection of the high-frequency changing area is reduced. Here, as an example, it is assumed that an image of update rectangle is accumulated for 330 msec (milliseconds).

When a predetermined period of time elapses from when the image of update rectangle is accumulated, the change frequency determination unit 14c determines the change frequency of the desktop screen by using a map obtained by dividing the desktop screen displayed by the client terminal 20 into a mesh pattern.

Figure 2:
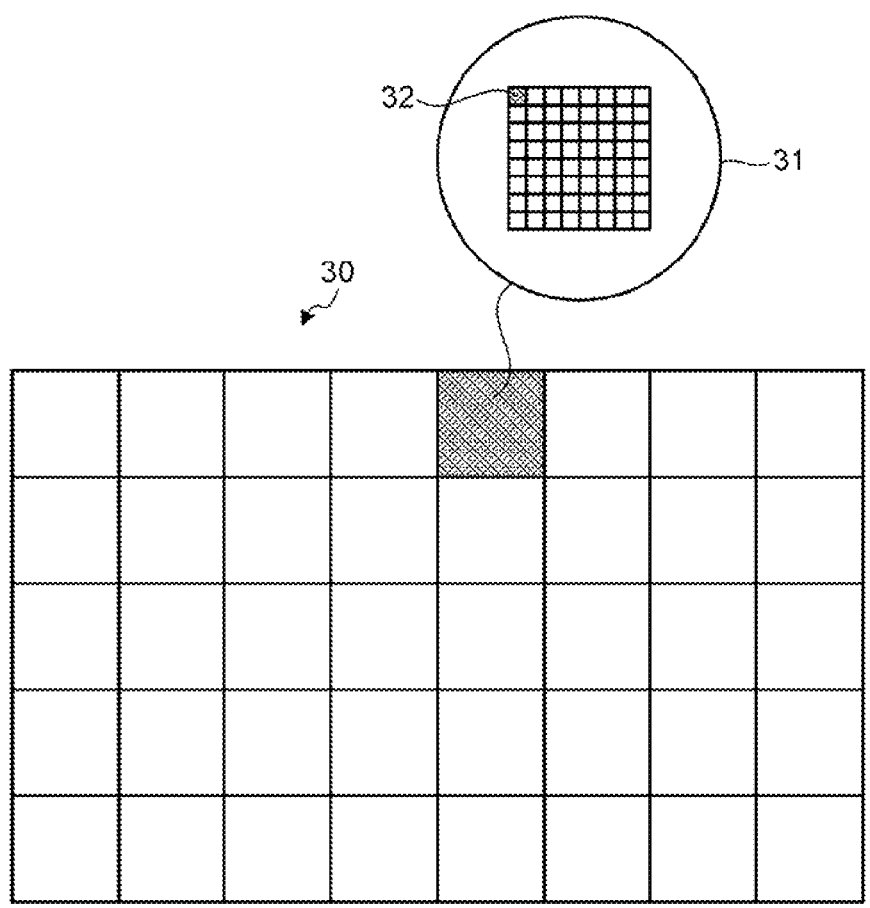
FIG. 2 is a diagram for explaining a dividing method of a desktop screen.

FIG. 2 is a diagram for explaining a dividing method of a desktop screen. Reference numeral 30 illustrated in FIG. 2 indicates a map for determining the change frequency. Reference numeral 31 illustrated in FIG. 2 indicates a mesh included in the map 30. Reference numeral 32 illustrated in FIG. 2 indicates one pixel included in a pixel block that forms the mesh 31. In the example illustrated in FIG. 2, it is assumed that the change frequency determination unit 14c divides the map 30 into meshes, each of which includes a block of 8 pixels by 8 pixels. In this case, one mesh includes 64 pixels.

Here, the change frequency determination unit 14c sequentially deploys the images of the update rectangles on the map for determining the change frequency according to the position and the size of the update rectangles accumulated in the internal work memory. Every time the change frequency determination unit 14c deploys an update rectangle on the map, the change frequency determination unit 14c cumulatively increments the number of changes of a mesh that overlaps the update rectangle on the map. At this time, when the update rectangle deployed on the map overlaps a predetermined number of pixels included in a mesh, the change frequency determination unit 14c adds 1 to the number of changes of the mesh. Here, it is assumed that the number of changes of a mesh is incremented if the update rectangle overlaps at least one pixel included in the mesh.

Figure 3A:
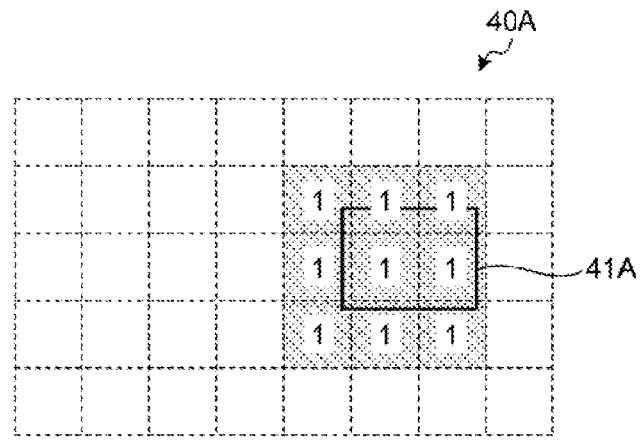
FIG. 3A is a diagram for explaining a determination method of change frequency of the desktop screen.
Figure 3B:
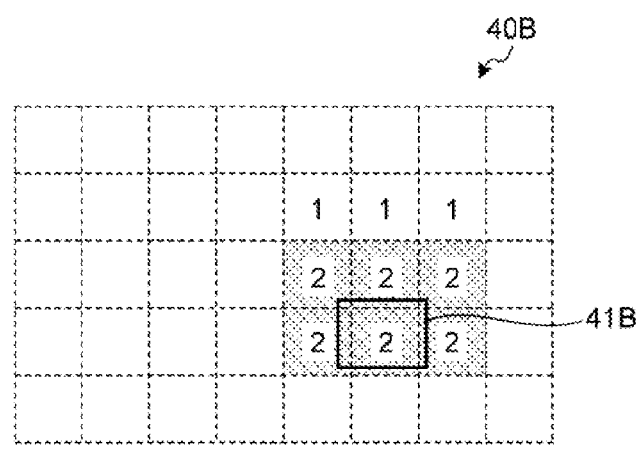
FIG. 3B is a diagram for explaining the determination method of change frequency of the desktop screen.
Figure 3C:
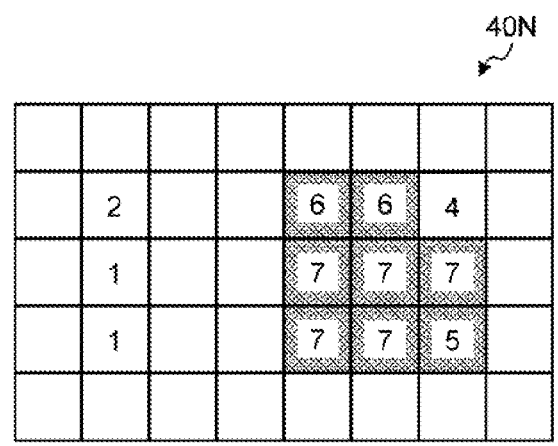
FIG. 3C is a diagram for explaining the determination method of change frequency of the desktop screen.

FIGS. 3A to 3C are diagrams for explaining a determination method of the change frequency of the desktop screen. Reference numerals 40A, 40B, and 40N illustrated in FIGS. 3A to 3C indicate a map for determining the change frequency. Reference numerals 41A and 41B illustrated in FIGS. 3A and 3B indicate an update rectangle. Here, the numbers illustrated in the meshes of the map 40A indicate the number of changes of the meshes when the update rectangle 41A is deployed. The numbers illustrated in the meshes of the map 40B indicate the number of changes of the meshes when the update rectangle 41B is deployed. Further, the numbers illustrated in the meshes of the map 40N indicate the number of changes of the meshes when all the update rectangles accumulated in the internal work memory are deployed. The meshes having no number in FIGS. 3A to 3C are meshes where the number of changes is zero.

As illustrated in FIG. 3A, when the update rectangle 41A is deployed on the map 40A, the shaded meshes overlap the update rectangle 41A. Therefore, the change frequency determination unit 14c adds 1 to the number of changes of the shaded meshes. In this case, the number of changes of each mesh is zero, so that the number of changes of the shaded meshes is incremented from 0 to 1. Further, when the update rectangle 41B is deployed on the map 40B, the shaded meshes overlap the update rectangle 41B. Therefore, the change frequency determination unit 14c adds 1 to the number of changes of the shaded meshes. In this case, the number of changes of each mesh is 1, so that the number of changes of the shaded meshes is incremented from 1 to 2. When all the update rectangles are deployed on the map, a result illustrated by the map 40N in FIG. 3C is obtained.

When the change frequency determination unit 14c deploys all the update rectangles accumulated in the internal work memory on the map, the change frequency determination unit 14c acquires meshes where the number of changes in a predetermined period of time, that is, the change frequency, exceeds a threshold value. In the example of FIG. 3C, if the threshold value is "4", the shaded meshes are obtained. The higher the threshold value is set, the more probable a portion in which an moving image is displayed on the desktop screen can be encoded by the second encoder 14g described later. It is possible to cause an end user to select the "threshold value" from values set in an incremental manner by a developer of the remote screen control application or the end user can directly set the "threshold value".

The high-frequency changing area identification unit 14d is a processing unit that identifies an area which is changed at a high frequency in the desktop screen displayed on the client terminal 20 as a high-frequency changing area.

Specifically, when meshes where the number of changes exceeds the threshold value are acquired by the change frequency determination unit 14c, the high-frequency changing area identification unit 14d corrects a mesh connection body in which adjacent meshes are connected to each other into a rectangular shape. As an aspect, the high-frequency changing area identification unit 14d calculates an interpolation area which interpolates the mesh connection body and adds the interpolation area to the mesh connection body, so that the high-frequency changing area identification unit 14d corrects the mesh connection body into a rectangular shape. An algorithm for calculating an area that can form the mesh connection body into a rectangular shape by minimum interpolation is applied to the calculation of the interpolation area.

FIG. 4 is a diagram for explaining the correction method of the mesh connection body. Reference numeral 51 illustrated in FIG. 4 indicates a mesh connection body before correction. Reference numeral 52 illustrated in FIG. 4 indicates an interpolation area. Reference numeral 53 illustrated in FIG. 4 indicates a mesh connection body after correction. As illustrated in FIG. 4, the high-frequency changing area identification unit 14d adds the interpolation area 52 to the mesh connection body 51, so that the high-frequency changing area identification unit 14d corrects the mesh connection body 51 into the rectangular shape 53. At this stage, synthesis of a rectangular shape described later is not completed and the rectangular shape 53 has not yet been determined as a high-frequency changing area, so that the corrected rectangular shape may be referred to as a candidate of the high-frequency changing area.

Thereafter, if there are a plurality of candidates of the high-frequency changing area, the high-frequency changing area identification unit 14d synthesizes a rectangular shape including a plurality of candidates of the high-frequency changing area, the distances between which are smaller than or equal to a predetermined value. The distance between the candidates of the high-frequency changing area is a shortest distance between the rectangular shapes after correction. As an example, when the high-frequency changing area identification unit 14d synthesizes candidates of the high-frequency changing area, the high-frequency changing area identification unit 14d calculates interpolation areas filling gaps between the candidates and adds the interpolation areas to the candidates of the high-frequency changing area to synthesize a rectangular shape including the candidates of the high-frequency changing area. An algorithm for calculating interpolation areas that can form the candidates of the high-frequency changing area into a synthesized body by filling gaps between the candidates by minimum interpolation areas is applied to the calculation of the interpolation areas.

FIG. 5 is a diagram for explaining the synthesis method of candidates of the high-frequency changing area. Reference numerals 61A and 61B illustrated in FIG. 5 indicate candidates of the high-frequency changing area. Reference numeral 62 illustrated in FIG. 5 indicates an interpolation area. Reference numeral 63 illustrated in FIG. 5 indicates a synthesized body of the candidate 61A of the high-frequency changing area and the candidate 61B of the high-frequency changing area. As illustrated in FIG. 5, the high-frequency changing area identification unit 14d adds the interpolation area 62 to the candidate 61A of the high-frequency changing area and the candidate 61B of the high-frequency changing area, the distance between which is smaller than or equal to a distance d, so that the high-frequency changing area identification unit 14d synthesizes the synthesized body 63 including the candidate 61A of the high-frequency changing area and the candidate 61B of the high-frequency changing area. The high-frequency changing area identification unit 14d identifies the synthesized body obtained in this way as a high-frequency changing area.

When the high-frequency changing area identification unit 14d identifies a high-frequency changing area in this way, the high-frequency changing area identification unit 14d transmits attribute information capable of identifying the position and the size of the high-frequency changing area to the client terminal 20. Thereby, the high-frequency changing area identification unit 14d displays blank in a portion corresponding to the high-frequency changing area in the bitmap image of the desktop screen displayed on the client terminal 20. Thereafter, the high-frequency changing area identification unit 14d clears the number of changes of the meshes mapped on the internal work memory. The high-frequency changing area identification unit 14d registers the attribute information of the high-frequency changing area in the internal work memory.

Figure 6A:
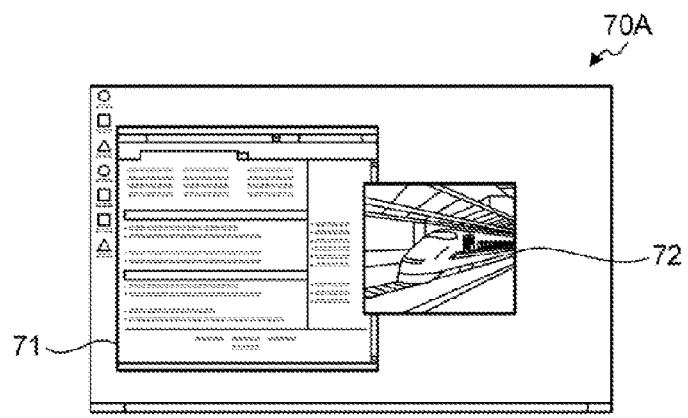
FIG. 6A is a diagram for explaining a notification method of attribute information of a high-frequency changing area.
Figure 6B:
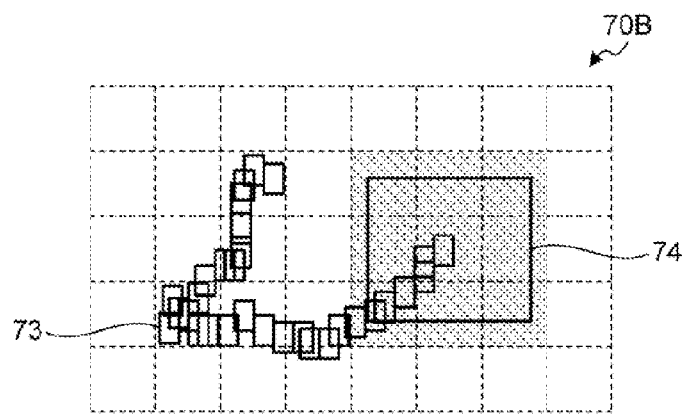
FIG. 6B is a diagram for explaining the notification method of attribute information of a high-frequency changing area.
Figure 6C:
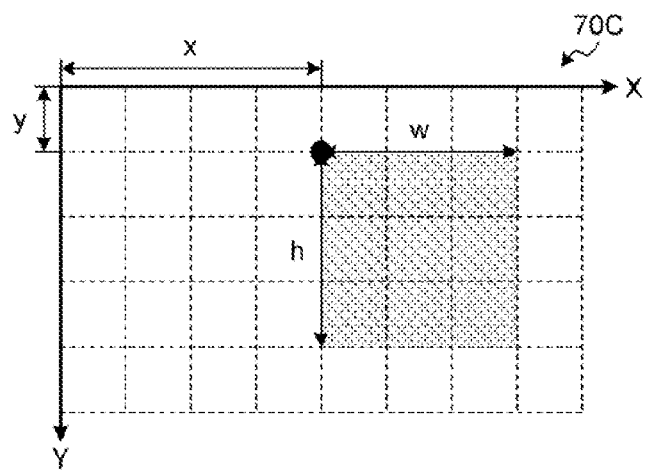
FIG. 6C is a diagram for explaining the notification method of attribute information of a high-frequency changing area.

FIGS. 6A to 6C are diagrams for explaining a notification method of the attribute information of the high-frequency changing area. Reference numeral 70A illustrated in FIG. 6A indicates an example of a desktop screen rendered in the frame buffer 13. Reference numerals 70B and 70C illustrated in FIGS. 6B and 6C indicate maps for determining the change frequency. Reference numeral 71 illustrated in FIG. 6A indicates a browser screen. Reference numeral 72 illustrated in FIG. 6A indicates a moving image reproduction screen. Reference numeral 73 illustrated in FIG. 6B indicates a movement trace of the mouse. Reference numeral 74 illustrated in FIG. 6B indicates a moving image reproduction area by an application.

As illustrated in FIG. 6A, the desktop screen 70A includes the browser screen 71 and the moving image reproduction screen 72. When changes over time are traced in the desktop screen 70A, as illustrated in FIG. 6B, the update rectangle of the browser screen 71 which is a still image is not detected and the movement trace of the mouse 73 and the update rectangle related to the moving image reproduction area 74 are detected. It is assumed that meshes where the number of changes exceeds the threshold value in the moving image reproduction area 74, that is, the shaded portion in FIG. 6B, are identified by the high-frequency changing area identification unit 14d. In this case, the high-frequency changing area identification unit 14d transmits the coordinates (x, y) of the upper-left vertex of a high-frequency changing area which is a shaded portion in FIG. 6C and the width w and the height h of the high-frequency changing area to the client terminal 20 as the attribute information of the high-frequency changing area.

Although, here, a case is described in which the coordinates of the upper-left vertex is employed as a point to specify the position of the high-frequency changing area, another vertex may be employed. Other than the vertexes, any points that can specify the position of the high-frequency changing area, such as for example, the center of gravity, can be employed. Although, here, a case is described in which the upper-left point on the screen is used as the origin of the coordinate axes XY, any point inside or outside the screen can be used as the origin.

When a high-frequency changing area is detected on a part of the desktop screen, the high-frequency changing area in the desktop screen begins to be converted into a moving image mode. In this case, the high-frequency changing area identification unit 14d inputs a bitmap image, which corresponds to the high-frequency changing area and which is extracted from the bitmap image rendered in the frame buffer 13, into the first encoder 14e described later. After the high-frequency changing area is detected, from a viewpoint of preventing the moving image mode from switching on and off frequently, the moving image mode of the high-frequency changing area is continued until the high-frequency changing area is not detected continuously for a predetermined period of time, for example, one second. In this case, even if the area is not identified as the high-frequency changing area, the high-frequency changing area identified last time is set to the moving image mode. On the other hand, an update rectangle not included in the high-frequency changing area is compressed by a still image compression method in the same manner as before the moving image mode is started. Specifically, an image of an update rectangle, which is included in the bitmap image rendered in the frame buffer 13 and which is not included in the high-frequency changing area, is inputted into the second encoder 14g by the color map generation unit 14j described later.

The first encoder 14e is a processing unit that encodes an image of update rectangle inputted by the color map generation unit 14j described later by using a still image compression method. As an aspect, the first encoder 14e encodes an image of each update rectangle into coded data of a still image by compressing the image by GIF (Graphic Interchange Format), PNG (Portable Network Graphics), or the like. Although, here, GIF and PNG are mentioned as a still image compression method using a color map, another method can be used. Compression efficiency of these compression methods tends to be higher than that of JPEG when handling an image where an object is rendered by wire frame or an image where a plane surface of an object is filled with the same color by CAD or using word processing software or spreadsheet software.

The first transmission unit 14f is a processing unit that transmits the coded data of update rectangle encoded by the first encoder 14e to the client terminal 20. As an example, an RFB protocol of VNC is employed as a communication protocol for transmitting the update rectangle.

The second encoder 14g is a processing unit that encodes an image inputted from the high-frequency changing area identification unit 14d by using a moving image compression method. As an aspect, the second encoder 14g encodes an image of a high-frequency changing area or a changing area into moving image coded data by compressing the image by MPEG. Although, here, MPEG is mentioned as a moving image compression method, another method such as Motion-JPEG can be used.

The second transmission unit 14h is a processing unit that transmits the coded data of moving image encoded by the second encoder 14g to the client terminal 20. As an example, RTP (Real-time Transport Protocol) can be employed as a communication protocol for transmitting the encoded image of the high-frequency changing area.

The color map generation unit 14j is a processing unit that generates a color map in which the number of colors is reduced from the number of colors used for the graphic driver 12 to render an image on the desktop screen. Here, the above "color map" indicates color information in which colors representing pixels are defined. For example, in the RGB color system, each of the three primary colors R (red), G (green), and B (blue) are represented by 8 bits. In the description below, it is assumed that a color map is generated, in which 24-bit color, that is, a full-color, which is used for the graphic driver 12 to render an image on the desktop screen, is reduced to one third, that is, 8-bit color, by using a median cut method.

As an aspect, the color map generation unit 14j changes an image used to generate a color map depending on whether or not the number of update rectangles generated by a rendering on the frame buffer 13 at this time is greater than or equal to a predetermined threshold value, for example, 5. The threshold value may be determined by the resolution of a display unit included in a terminal apparatus used by a user. For example, when the resolution of the display unit is high and the number of pixels on the entire screen is large, a large threshold value may be used, and when the number of pixels on the entire screen is small, a small threshold value may be used. Thereby, a threshold value based on time used to generate a color map from the entire screen can be set, so that an upper limit of time for generating a color map is optimized. The threshold value is set so that a parameter indicating a processing load such as performance and usage rate of a processor and a memory mounted on the server apparatus 10 is smaller than a predetermined acceptable value, for example, a default value set by a developer or a specified value specified by a system administrator.

Specifically, when the number of update rectangles is smaller than the threshold value, even if one color map is individually generated for one update rectangle, the amount of processing of the subtractive color process is relatively small, so that it is estimated that the time for the subtractive color process of the update rectangles is not excessively long. Therefore, the color map generation unit 14j generates a color map for each update rectangle by using images of the update rectangles. Thereby, while reducing the amount of data transmission by the subtractive color process of an update rectangle image described later, image quality of the desktop screen displayed by the client terminal 20 is prevented from degrading.

On the other hand, when the number of update rectangles is greater than or equal to the threshold value, if one color map is individually generated for one update rectangle, the overhead for generating the color maps increases, so that it is estimated that the time for the subtractive color process is long. Therefore, the color map generation unit 14j generates a color map commonly used for each update rectangle from the entire desktop screen rendered in the frame buffer 13. Thereby, the time for the subtractive color process is prevented from increasing along with the reduction of the amount of data transmission.

The generation method of the color map will be described. First, the color map generation unit 14j counts the number of colors of an image for which a color map is generated. At this time, when a color map is generated for each update rectangle, an image of update rectangle is used. On the other hand, when a common color map is generated, the desktop screen is used. Here, a case in which a color map is generated for each update rectangle will be described as an example. However, when a common color map is generated, the same process is preformed.

The color map generation unit 14j generates a histogram representing frequencies of occurrence of each color component included in an image of update rectangle. Next, the color map generation unit 14j defines a box including all pixels of update rectangle distributed in a color space represented by R axis, G axis, and B axis, and divides the box so that all the pixels of update rectangle included in the box are equally divided. At this time, the color map generation unit 14j divides the box in a direction perpendicular to a long side of the box, so that the color map generation unit 14j determines one of R axis, G axis, and B axis by which the color map generation unit 14j divides the box. The color map generation unit 14j further defines a box including pixels of update rectangle included in an area obtained by dividing the first defined box, that is, a half of all the pixels. Then, the color map generation unit 14j further divides the box so that the pixels of update rectangle included in the box is equally divided. The method for determining the axis used for dividing the box and the method for specifying the position at which the box is divided are described by using examples that facilitate understanding. However, other known methods may be used.

Thereafter, the color map generation unit 14j recursively defines and divides the box until the number of the divided boxes becomes a target number. At this time, when the color map generation unit 14j selects a box to be divided from a plurality of boxes, the color map generation unit 14j may preferentially select a box including the largest number of pixels or may preferentially select a box having the largest volume. When the number of the divided boxes becomes the target number, the color map generation unit 14j assigns an index value to an RGB value of a representative color of each box by calculating an average value of end points of each box. Thereby, a color map in which the index values and the RGB values are associated with each other is generated.

In this way, an area in which distribution of color components is dense is divided into smaller partial spaces and areas in which distribution of color components is sparse are integrated into a larger partial space, so that it is possible to reproduce an image by the number of colors which is smaller than that of full-color while preventing image quality from degrading as much as possible. Therefore, even when occurrences of update rectangle converge in a period of time shorter than a period in which a high-frequency changing area is identified, the amount of data transmission between the server apparatus 10 and the client terminal 20 can be suppressed. Therefore, even when the moving image mode is automatically started, it is possible to prevent an operation response from degrading before the moving image mode is started.

Although, here, the number of colors are reduced by the median cut method, an algorithm other than the median cut method can be used. Although a case in which an image of update rectangle is represented by the RGB color system is described as an example, when an image of update rectangle is represented by another color system such as, for example, HSV, the present embodiment can be applied.

After generating the color map, the color map generation unit 14j performs the subtractive color process on an image of update rectangle by using the color map. As an aspect, for each pixel included in an image of update rectangle, the color map generation unit 14j selects an index value of an RGB value having the nearest Euclidean distance to the RGB value of the pixel from the color map. In this way, an index value is provided as a pixel value instead of the RGB value, so that the number of colors of full-color, which is 16,777,216, is reduced to 256.

As another aspect, when the moving image mode of the high-frequency changing area is finished, the color map generation unit 14j generates an overwrite color map for overwriting the desktop screen transmitted to the client terminal 20 during the moving image mode from the desktop screen after the moving image mode. Then, the color map generation unit 14j performs the subtractive color process on an image of an overwrite area, which is identified as the high-frequency changing area during the moving image mode, in the desktop screen after the moving image mode by using the overwrite color map. The image of the overwrite area where the subtractive color process is performed in this way is encoded by the first encoder 14e and then transmitted to the client terminal 20. The image of the overwrite area is transmitted independently regardless of whether or not an update rectangle is generated by the screen generation unit 14b.

Thereby, the desktop screen of the client terminal 20, the image quality of which is lower than a still image due to the moving image mode, can be overwritten by a still image. Therefore, during the moving image mode in which the degradation of image quality is difficult to be recognized, a coarse desktop screen is displayed, and when the moving image mode is finished and the degradation of image quality is easily recognized, a desktop screen where the degradation of image quality is suppressed can be displayed.

Although, here, a case in which the color map generation unit 14j generates a color map and performs the subtractive color process is described as an example, each process may be performed by separate functional units, such as a generation unit and a color subtraction unit. Although, here, a case in which the color map generation unit 14j autonomously selects one color map to be generated from a color map for each update rectangle, a common color map, and an overwrite color map is described as an example, the disclosed apparatus is not limited to this. For example, other functional units such as the color subtraction unit and the first encoder may switch a color map generated by a generation unit which selectively generates one of a color map for each update rectangle, a common color map, and an overwrite color map.

Various integrated circuits and electronic circuits can be employed for the OS execution controller 11a, the application execution controller 11b, the graphic driver 12, and the remote screen controller 14. Part of functional units included in the remote screen controller 14 can be other integrated circuits and electronic circuits. Examples of the integrated circuits include ASIC (Application Specific Integrated Circuit) and FPGA (Field Programmable Gate Array). Examples of the electronic circuits include CPU (Central Processing Unit) and MPU (Micro Processing Unit).

Specific Example

Next, transition of an original image used to generate a color map will be described with reference to FIG. 7. FIG. 7 is a diagram illustrating a specific example for explaining the transition of the original image used to generate a color map. In the example illustrated in FIG. 7, it is assumed that CAD (Computer Aided Design) is performed on the server apparatus 10 responding to operation information from the client terminal 20. Reference numerals 200, 210, 220, 230, 240, and 250 illustrated in FIG. 7 indicate CAD windows included in the desktop screen displayed on the client terminal 20.

As illustrated in FIG. 7, when an operation that reads an object such as a product or a component included in a product is performed on the CAD window 200, the CAD window 210 including the object is displayed on the client terminal 20. At this time, an area 210a including the entire object is generated as an update rectangle by the screen generation unit 14b. In this case, only one update rectangle, which is the area 210a including the entire object, is generated, so that the number of update rectangles is smaller than 5, which is the threshold value. Therefore, a color map is generated using an image of the update rectangle 210a.

When a rotation operation of the object is received on the CAD window 210, the CAD window 220 in which the object is rotated is displayed on the client terminal 20. At this time, areas 220a to 220g, which are changed according to the rotation of the object, are generated as update rectangles by the screen generation unit 14b. In this case, seven update rectangles corresponding to the areas 220a to 220g are generated, so that the number of update rectangles exceeds 5, which is the threshold value. Therefore, a color map is generated using an image of the desktop screen. Thereby the color map needs to be generated only once, although if the color map is generated for each update rectangle, the color map needs to be generated seven times.

Thereafter, if a rotation operation of the object is further received on the CAD window 220, the CAD window 230 in which the object is further rotated is displayed on the client terminal 20. At this time, areas 230a to 230g, which are changed according to the rotation of the object, are generated as update rectangles by the screen generation unit 14b. Also in this case, seven update rectangles corresponding to the areas 230a to 230g are generated, so that the number of update rectangles exceeds 5, which is the threshold value. Therefore, a color map is generated using the image of the desktop screen. Thereby, in the same manner as in the CAD window 210, the color map needs to be generated only once, although if the color map is generated for each update rectangle, the color map needs to be generated seven times.

Subsequently, if a rotation operation of the object is further received on the CAD window 230, the CAD window 240 in which the object is further rotated is displayed on the client terminal 20. At this time, it is assumed that an area 240a, which includes most or all of the object, is identified as a high-frequency changing area. In this case, moving image compression coding is performed on the image of the high-frequency changing area, and then the image is transmitted to the client terminal 20, so that the amount of data transmission between the server apparatus 10 and the client terminal 20 can be reduced. On the other hand, the image of the area 240a, whose image quality is lower than a still image, is displayed on the client terminal 20. However, the object is being rotated, so that the degradation of image quality is difficult to be recognized by a user of the client terminal 20.

Thereafter, if non-operation state is continued while the CAD window 240 is displayed, the CAD window 250 in which an image after the moving image mode is finished is overwritten is displayed on the client terminal 20. In this way, when the moving image mode is finished, the image of the high-frequency changing area, which is a moving image, is overwritten by the image of an overwrite area 250a. In this case, the color map is generated using the image of the overwrite area 250a. The still image is overwritten, so that a desktop screen in which the degradation of the image quality is suppressed can be displayed when the degradation of the image quality becomes easily recognized.

Configuration of Client Terminal

Next, a functional configuration of the client terminal according to the present embodiment will be described. As illustrated in FIG. 1, the client terminal 20 includes an input unit 21, a display unit 22, a client side remote screen controller 23. In addition to the functional components illustrated in FIG. 1, the example of FIG. 1 includes various functional components included in a known computer, such as a function of an audio output unit.

The input unit 21 is an input device that receives various information such as an instruction input to the client side remote screen controller 23. As an example, a keyboard and a mouse can be applied to the input unit 21. The display unit 22 described later realizes a pointing device function in conjunction with the mouse.

The display unit 22 is a display device that displays various information such as a desktop screen transmitted from the server apparatus 10. As an example, a monitor, a display, and a touch panel can be applied to the display unit 22.

The remote screen controller 23 is a processing unit that receives the remote screen control service of the server apparatus 10 through the client side remote screen control application. As illustrated in FIG. 1, the remote screen controller 23 includes an operation information notification unit 23a, a first reception unit 23b, a first decoder 23c, and a first display controller 23d. Further, the remote screen controller 23 includes a second reception unit 23e, a second decoder 23f, and a second display controller 23g.

The operation information notification unit 23a is a processing unit that notifies the server apparatus 10 of operation information by the input unit 21. As an aspect, the operation information notification unit 23a notifies of operation information such as left and right clicks of the mouse, a double click, a drag, and an amount of movement of the mouse obtained via a moving operation of the mouse. As another example, the operation information notification unit 23a also notifies of operation information such as an amount of rotation of a mouse wheel and a type of a key pressed on the keyboard.

The first reception unit 23b is a processing unit that receives the coded data of update rectangle transmitted by the first transmission unit 14f of the server apparatus 10. The first reception unit 23b also receives the attribute information of the high-frequency changing area transmitted by the high-frequency changing area identification unit 14d of the server apparatus 10.

The first decoder 23c is a processing unit that decodes the coded data of update rectangle received by the first reception unit 23b. The first decoder 23c is provided with a decoder of a decoding method compatible with an encoding method provided in the server apparatus 10.

The first display controller 23d is a processing unit that displays an image of update rectangle decoded by the first decoder 23c on the display unit 22. As an aspect, the first display controller 23d displays a bitmap image of update rectangle in an screen area of the display unit 22 corresponding to the position and the size included in the attribute information of update rectangle received by the first reception unit 23b. When the attribute information of the high-frequency changing area is received by the first reception unit 23b, the first display controller 23d performs the following process: the first display controller 23d defines a screen area on the display unit 22 corresponding to the position and the size of the high-frequency changing area included in the attribute information of the high-frequency changing area as a blank area where no bitmap image is displayed.

The second reception unit 23e is a processing unit that receives the coded data of a moving image transmitted by the second transmission unit 14h of the server apparatus 10. The second reception unit 23e also receives the attribute information of the high-frequency changing area transmitted by the high-frequency changing area identification unit 14d of the server apparatus 10.

The second decoder 23f is a processing unit that decodes the coded data of a moving image received by the second reception unit 23e. The second decoder 23f is provided with a decoder of a decoding method compatible with an encoding method provided in the server apparatus 10.

The second display controller 23g is a processing unit that displays the high-frequency changing area decoded by the second decoder 23f on the display unit 22 based on the attribute information of the high-frequency changing area received by the second reception unit 23e. As an aspect, the second display controller 23g reproduces a moving image of the high-frequency changing area in a screen area on the display unit 22 corresponding to the position and the size of the high-frequency changing area included in the attribute information of the high-frequency changing area.

Various integrated circuits and electronic circuits can be employed for the client side remote screen controller 23. Part of functional units included in the remote screen controller 23 can be other integrated circuits and electronic circuits. Examples of the integrated circuits include an ASIC and an FPGA. Examples of the electronic circuits include a CPU and an MPU.

Process Flow

Next, a process flow of the server apparatus 10 according to the present embodiment will be described. FIGS. 8 and 9 is a flowchart illustrating a procedure of an image transmission process according to the first embodiment. The image transmission process is performed by the server apparatus 10. The image transmission process starts when a bit map data is rendered in the frame buffer 13.

As illustrated in FIG. 8, the screen generation unit 14b generates an image of update rectangle by combining pixels of a portion changed from the previous frame and forming the pixels into a rectangular shape (step S101). Then, the screen generation unit 14b generates a packet for transmitting the update rectangle from the image of update rectangle generated in the previous step (step S102).

Subsequently, the change frequency determination unit 14c accumulates an update rectangle generated by the screen generation unit 14b in an internal memory not illustrated in the drawings (step S103). At this time, if a predetermined period of time does not elapse from when the image of update rectangle begins to be accumulated (NO in step S104), the change frequency determination unit 14c skips the subsequent processes related to recognition of the high-frequency changing area and proceeds to step S113 described later.

On the other hand, if a predetermined period of time elapses from when the image of update rectangle begins to be accumulated (YES in step S104), the change frequency determination unit 14c performs the following process: the change frequency determination unit 14c sequentially deploys the images of the update rectangles on the map for determining the change frequency according to the position and the size of the update rectangles accumulated in the internal work memory (step S105). Then, the change frequency determination unit 14c acquires meshes where the change frequency exceeds a threshold value from the meshes included in the map for determining the change frequency (step S106).

Thereafter, the high-frequency changing area identification unit 14d determines whether or not the change frequency determination unit 14c acquires meshes where the change frequency exceeds the threshold value (step S107). At this time, if there is no mesh where the change frequency exceeds the threshold value (NO in step S107), there is no high-frequency changing area on the desktop screen, so that the high-frequency changing area identification unit 14d skips the subsequent processes related to recognition of the high-frequency changing area and proceeds to step S5112.

On the other hand, if there are meshes where the change frequency exceeds the threshold value (YES in step S107), the high-frequency changing area identification unit 14d corrects a mesh connection body in which adjacent meshes are connected to each other into a rectangular shape (step S108).

If there are a plurality of corrected rectangles, that is, a plurality of candidates of the high-frequency changing area (YES in step S109), the high-frequency changing area identification unit 14d performs the following process: the high-frequency changing area identification unit 14d synthesizes a rectangular shape including a plurality of candidates of the high-frequency changing area, the distances between which are smaller than or equal to a predetermined value (step S110). If there is not a plurality of candidates of the high-frequency changing area (NO in step S109), the high-frequency changing area identification unit 14d does not synthesizes a rectangular shape and proceeds to step S111.

Subsequently, the high-frequency changing area identification unit 14d transmits attribute information capable of identifying the position and the size of the high-frequency changing area to the client terminal 20 (step S111). Then, the high-frequency changing area identification unit 14d clears the number of changes of the meshes mapped on the internal work memory (step S112).

Thereafter, if a high-frequency changing area is detected (NO in step S113), the second encoder 14g encodes an image of the high-frequency changing area into coded data of a moving image (step S114).

Even when a high-frequency changing area is not detected, if the undetected period of the high-frequency changing area is shorter than a predetermined period of time (YES in step S113 and NO in step S115), the second encoder 14g encodes an image of the high-frequency changing area into coded data of a moving image (step S114).

On the other hand, if a high-frequency changing area is continuously not detected for the predetermined period of time (YES in step S113 and YES in step S115), the color map generation unit 14j performs the following process: the color map generation unit 14j generates an overwrite color map by using the desktop screen after the moving image mode is finished (step S116).

Then, the color map generation unit 14j performs the subtractive color process on an image of an overwrite area, which is identified as the high-frequency changing area during the moving image mode, in the desktop screen after the moving image mode by using the overwrite color map (step S117). Thereafter, the first encoder 14e encodes the image of the overwrite area on which the subtractive color process is performed into coded data of a still image (step S118).

Thereafter, if there is an update rectangle (YES in step S119), the color map generation unit 14j determines whether or not the number of update rectangles is greater than or equal to a predetermined threshold value, for example, 5 (step S120).

At this time, if the number of update rectangles is greater than or equal to the threshold value (YES in step S120), if one color map is individually generated for one update rectangle, the overhead for generating the color maps increases, so that it is estimated that the time for the subtractive color process is long. Therefore, the color map generation unit 14j generates a color map commonly used for each update rectangle from the entire desktop screen rendered in the frame buffer 13 (step S121).

The color map generation unit 14j performs the subtractive color process on an image of each update rectangle by using the common color map (step S122). Subsequently, the first encoder 14e encodes images of each update rectangle on which the subtractive color process is performed into coded data of a still image (step S123).

On the other hand, when the number of update rectangles is smaller than the threshold value (NO in step S120), even if one color map is individually generated for one update rectangle, the amount of processing of the subtractive color process is relatively small, so that it is estimated that the time for the subtractive color process of the update rectangles is not excessively long. Therefore, the color map generation unit 14j generates a color map for each update rectangle by using images of the update rectangles (step S124).

The color map generation unit 14j performs the subtractive color process on an image of each update rectangle by using a color map generated for each update rectangle (step S122). Subsequently, the first encoder 14e encodes images of each update rectangle on which the subtractive color process is performed into coded data of a still image (step S123).

Thereafter, the first transmission unit 14f and the second transmission unit 14h transmit coded data of a still image and/or a moving image to the client terminal 20 (step S125) and completes the process.

Effect of First Embodiment

As described above, the server apparatus 10 according to the present embodiment makes a color map for each update rectangle if the number of update rectangles on the screen is small when the desktop screen is transmitted, while the server apparatus 10 makes a color map commonly used for update rectangles from the entire desktop screen if the number of update rectangles on the screen is large. Therefore, the server apparatus 10 according to the present embodiment can reduce the number of generation times of the color map when the overhead of generating the color maps is large. Thus, according to the server apparatus 10 of the present embodiment, the time for the compression process can be reduced.

[b] Second Embodiment

Although the embodiment related to the disclosed apparatus has been described, the present invention may be implemented in various different forms other than the embodiment described above. Therefore, other embodiments included in the present invention will be described below.

Extension of Map Clearing

For example, in the first embodiment, a case is described in which the high-frequency changing area identification unit 14d clears the map for determining the change frequency in accordance with a period of accumulating the update rectangle. However, the timing of clearing the map for determining the change frequency is not limited to this.

As an example, even after the change frequency does not exceeds a threshold value in an area determined to be a high-frequency changing area, the high-frequency changing area identification unit 14d may continuously identify the area as a high-frequency changing area for a predetermined period of time.

Figure 10A:
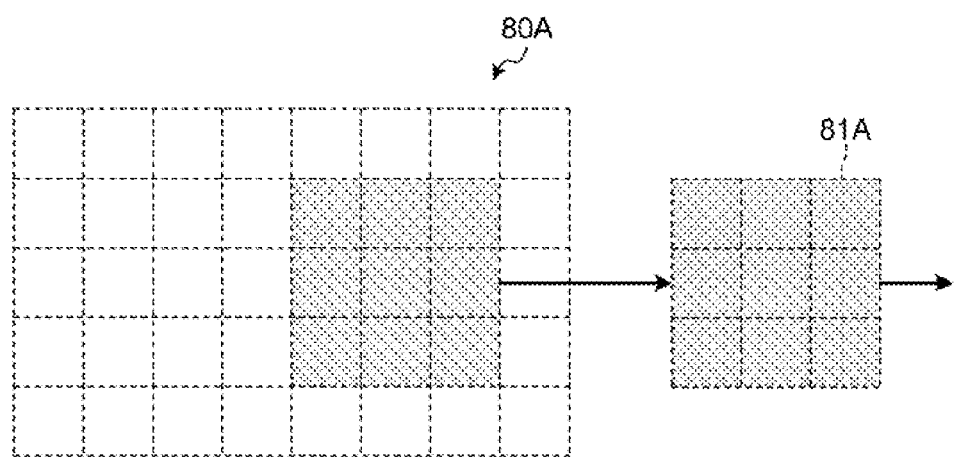
FIG. 10A is a diagram for explaining an extension method of map clearing.
Figure 10B:
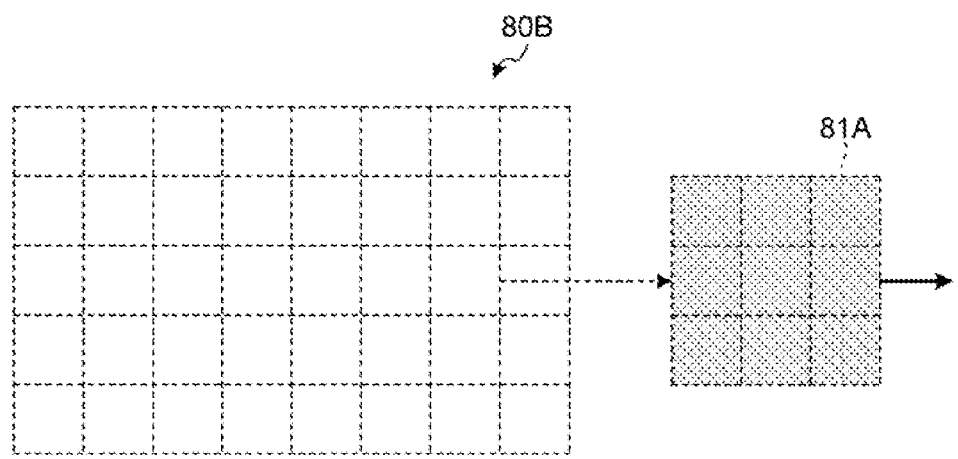
FIG. 10B is a diagram for explaining the extension method of map clearing.

FIGS. 10A and 10B are diagrams for explaining an extension method of map clearing. The example of FIG. 10A illustrates a map 80A for determining the change frequency at a time point when the high-frequency changing area is first detected and an identification result 81A of the high-frequency changing area at that time point. The example of FIG. 10B illustrates a map 80B for determining the change frequency at a certain time point within a predetermined period of time from when the high-frequency changing area is first detected and the identification result 81A of the high-frequency changing area at that time point.

As illustrated in FIG. 10A, when a mesh connection body in which the number of changes exceeds a threshold value is obtained in the map 80A and the identification result 81A of the high-frequency changing area is obtained, even if a mesh connection body in which the number of changes exceeds the threshold value is not obtained thereafter, the identification result 81A is maintained for a predetermined period of time. In other words, as illustrated in FIG. 10B, even if a mesh connection body in which the number of changes exceeds the threshold value is not obtained in the map 80A, the identification result 81A of the high-frequency changing area is maintained for a predetermined period of time from when the identification result 81A of the high-frequency changing area is first detected. It is possible to cause an end user to select the "threshold value" from values set in an incremental manner by a developer of the server side remote screen control application or the end user can directly set the "threshold value".

Thereby, even if motion disappears intermittently in an area in which a moving image is actually reproduced, the high-frequency changing area is not identified intermittently, so that it is possible to prevent frames from dropping intermittently in the high-frequency changing area. Further, the identification result of the high-frequency changing area is maintained, so that the size of the high-frequency changing area is stabilized. Therefore, the frequency of initializing parameters of encoding can be reduced, so that it is possible to reduce the load applied to the encoder.

Suppression of Reduction of High-Frequency Changing Area

As another example, when an area identified as a high-frequency changing area is reduced from an area previously identified as a high-frequency changing area, the high-frequency changing area identification unit 14d performs the following process: if the reduction ratio is smaller than or equal to a predetermined threshold value, the high-frequency changing area identification unit 14d maintains the area previously identified as a high-frequency changing area as the current identification result.

Figure 11A:
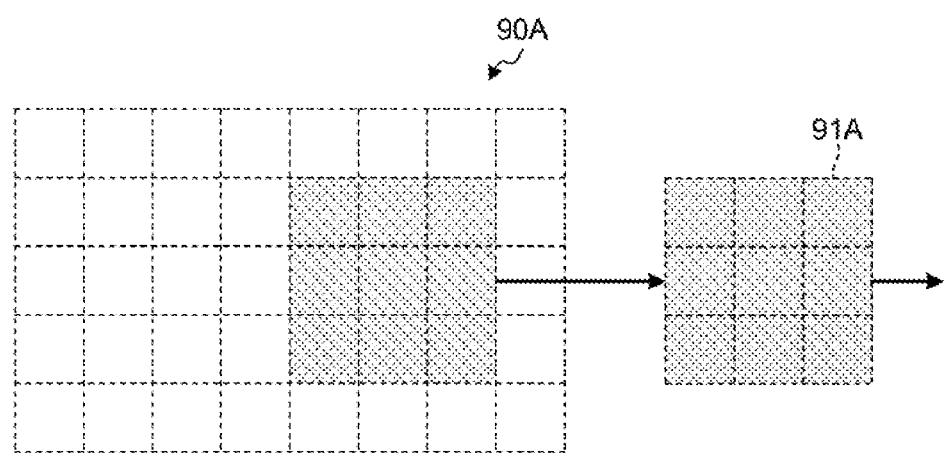
FIG. 11A is a diagram for explaining a suppression method related to reduction of a high-frequency changing area.
Figure 11B:
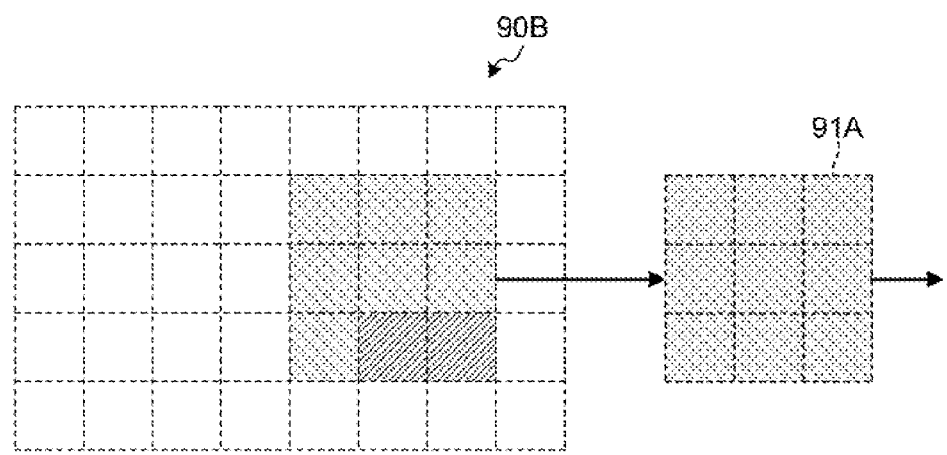
FIG. 11B is a diagram for explaining the suppression method related to reduction of a high-frequency changing area.

FIGS. 11A and 11B are diagrams for explaining a suppression method related to reduction of a high-frequency changing area. The example of FIG. 11A illustrates a map 90A for determining the change frequency and an identification result 91A of the high-frequency changing area at a time point T1. The example of FIG. 11B illustrates a map 90B for determining the change frequency and the identification result 91A of the high-frequency changing area at a time point T2. Here, the relationship between the time point T1 and the time point T2 is T1<T2.

As illustrated in FIG. 11A, when a mesh connection body in which the number of changes exceeds a threshold value is obtained in the map 90A and the identification result 91A of the high-frequency changing area is obtained, even if the mesh connection body in which the number of changes exceeds the threshold value is reduced after the time point T1, the high-frequency changing area is not reduced immediately. In other words, as illustrated in FIG. 11B, even when the mesh connection body in which the number of changes exceeds the threshold value is reduced by an area filled with oblique lines, if the area is smaller than or equal to a predetermined threshold value, for example, a half the size of the mesh connection body, the identification result 91A of the high-frequency changing area is maintained.

Thereby, even if a partial motion becomes intermittent in an area in which a moving image is actually reproduced, the high-frequency changing area is not identified intermittently, so that it is possible to prevent frames from dropping intermittently in the high-frequency changing area. Further, the identification result of the high-frequency changing area is maintained, so that the size of the high-frequency changing area is stabilized. Therefore, the frequency of initializing parameters of encoding can be reduced, so that it is possible to reduce the load applied to the encoder.

Generation Method of Color Map

In the first embodiment, an example is described in which a color map is generated from colors used in the entire desktop screen rendered in the frame buffer 13 when a color map common to each update area is generated. However, the disclosed apparatus does not always have to use the colors of the entire desktop screen. In other words, when a color map common to each update area is generated, the disclosed apparatus may use at least colors used in images of each update area in the entire desktop screen.

Application Example

In the first embodiment, a case is illustrated in which when the number of update rectangles is greater than or equal to a threshold value, a color map common to each update rectangle is generated from the desktop screen. However, only when the number of colors in the desktop screen is small, a common color map may be generated.

When an application such as CAD, word processing software, and spreadsheet software is performed, the number of used colors may be smaller than that in a wall paper and a window such as a browser. In this case, a common color map may be continuously generated only when the number of colors used in the desktop screen is smaller than a predetermined threshold value when counting the number of colors in the desktop screen while the color map is being generated. Thereby it is possible to prevent a common color map from being generated when the number of colors used in the desktop screen is large such as in the case of a wallpaper and a window of a browser and prevent the image quality of the desktop screen displayed on the client terminal 20 from degrading significantly.

Overwrite Area

In the first embodiment, a case is illustrated in which an area that is a high-frequency changing area during the moving image mode is defined as an overwrite area, the disclosed apparatus is not limited to this. For example, the disclosed apparatus can define the entire desktop screen as an overwrite area or may define only an area in which an update rectangle is actually generated in a period of time from when the moving image mode is started to when the moving image mode is finished as an overwrite area.

The constituent elements of each device illustrated in the drawings need not be physically configured as illustrated. In other words, specific forms of distribution and integration of the apparatuses are not limited to those illustrated in the drawings, and all or part of the apparatuses can be functionally or physically distributed or integrated in arbitrary units according to various loads and the state of use.

For example, the transmission processes of an image performed by the first transmission unit 14f and the second transmission unit 14h of the server apparatus 10 may be integrated into one transmission unit. Also, the reception processes of an image performed by the first reception unit 23b and the second reception unit 23e of the client terminal 20 may be integrated into one image reception unit. Further, the display control processes performed by the first display controller 23d and the second display controller 23g of the client terminal 20 may be integrated into one display controller.

Image Transmission Program

The various processes described in the above embodiment can be realized by executing a program prepared in advance by a computer such as a personal computer and a workstation. Therefore, an example of a computer that executes an image transmission program having the same functions as those in the above embodiment will be described below with reference to FIG. 12.

Figure 12:
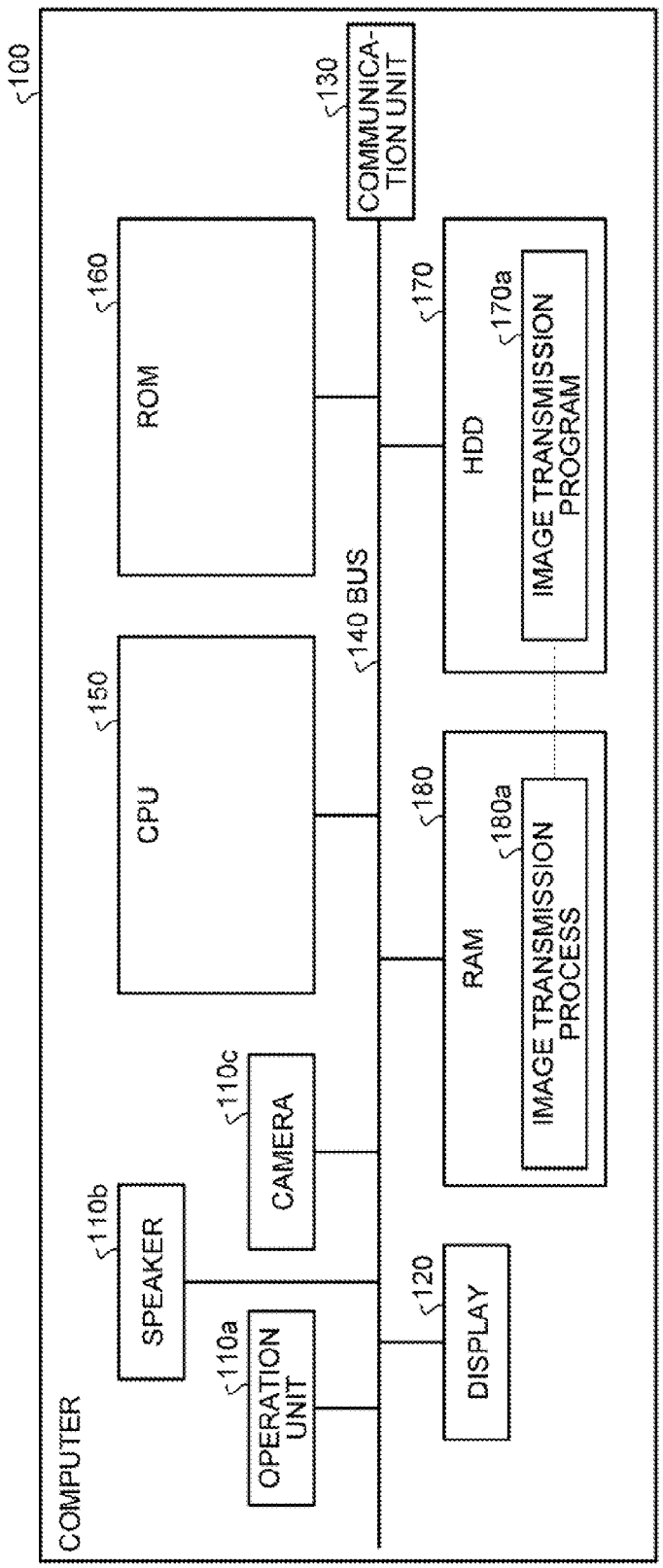
FIG. 12 is a diagram for explaining an example of a computer that executes an image transmission program according to the first embodiment and a second embodiment.

FIG. 12 is a diagram for explaining an example of a computer that executes an image transmission program according to the first and the second embodiments. As illustrated in FIG. 12, a computer 100 includes an operation unit 110a, a speaker 110b, a camera 110c, a display 120, and a communication unit 130. Further, the computer 100 includes a CPU 150, a ROM 160, an HDD 170, and a RAM 180. These components 110 to 180 are connected to each other through a bus 140.

As illustrated in FIG. 12, the HDD 170 stores in advance an image transmission program 170a having the same functions as those of the remote screen controller 14 of the server apparatus described in the first embodiment. In the image transmission program 170a, in the same manner as the constituent components of the remote screen controller 14, constituent components may be arbitrarily integrated or separated. Namely, all data stored in the HDD 170 does not always have to be stored in the HDD 170, and a part of data for processes may be stored in the HDD 170.

The CPU 150 reads the image transmission program 170a from the HDD 170 and deploys the image transmission program 170a in the RAM 180. Thereby, as illustrated in FIG. 12, the image transmission program 170a functions as an image transmission process 180a. The image transmission process 180a appropriately deploys various data read from the HDD 170 in an area on the RAM 180 assigned to the image transmission process 180a and performs various processes based on the deployed various data. The image transmission process 180a includes the processes performed by each component in the remote screen controller 14 illustrated in FIG. 1, for example, the processes illustrated in FIGS. 8 and 9. Furthermore, all the processing units virtually realized on the CPU 150 do not always have to operate on the CPU 150, and only the processing unit for the process just has to be virtually realized.

Incidentally, the image transmission program 170a does not always have to be stored in the HDD 170 or the ROM 160 from the beginning. For example, each program is stored in a "portable physical medium" such as a flexible disk which is a so-called FD, ROM, a DVD disk, a magnetic optical disk, and an IC-card, which are inserted into the computer 100. The computer 100 may acquire programs from the portable physical medium and execute the programs. The programs are stored in another computer or the server apparatus which are connected to the computer 100 through a public line, the Internet, LAN, or WAN, and the computer 100 may acquire the programs from another computer or the server apparatus and execute the programs.

According to an aspect of the information processing apparatus disclosed by the present application, there is an effect that the time required for the compression process can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A remote screen control device comprising:
a memory; and
a processor coupled to the memory, wherein the processor executes a process comprising:
rendering a process result of software on an image memory that stores a display image to be displayed on a terminal apparatus connected via a network;
detecting an update area in which an update occurs between frames of the display image;
selecting either of a first generation process that generates a color map for each update area based on colors used in an image of the update area, and a second generation process that generates a color map commonly used between the update areas based on colors used in the entire display image or an image of an area that includes all of update areas, according to a number of the detected update areas;
performing the first generation process or the second generation process, selected at the selecting;
reducing a number of colors in the update areas using the color map generated by performing the first generation process or the second generation process; and
first transmitting a compressed image of update area to the terminal apparatus, wherein
the selecting includes selecting the first generation process when the number of the detected update areas is less than a threshold value, and selecting the second generation process when the number of the detected update areas is greater than or equal to the threshold value.

2. The remote screen control device according to claim 1, wherein the processor executes the process further comprising:

identifying a high-frequency changing area in which a frequency of update between frames of the display image is higher than or equal to a predetermined frequency;
setting an image of a high-frequency changing area identified from the display image into a moving image mode; and
second transmitting an image of a high-frequency changing area, which is set into the moving image mode, to the terminal apparatus, wherein
the selecting further includes selecting, when the moving image mode set is finished, a third generation process that generates an overwrite color map that overwrites an image transmitted to the terminal apparatus during the moving image mode set, based on colors used in the display image,
the performing includes performing the third generation process when the third generation process is selected,
the reducing includes reducing the number of colors in part or all of the display image using the generated overwrite color map, and
the first transmitting includes transmitting part or all of the display image compressed by the reducing to the terminal apparatus.

3. The remote screen control device according to claim 1, wherein
the selecting further includes selecting the second generation process when the number of colors included in the display image rendered on the image memory is less than or equal to a predetermined number of colors.

4. A remote screen control method comprising:
rendering, using a processor, a process result of software on an image memory that stores a display image to be displayed on a terminal apparatus connected via a network;
detecting, using the processor, an update area in which an update occurs between frames of the display image;
selecting, using the processor, either of a first generation process that generates a color map for each update area based on colors used in an image of the update area, and a second generation process that generates a color map commonly used between the update areas based on colors used in the entire display image or an image of an area that includes all of update areas, according to a number of the detected update areas;
performing the first generation process or the second generation process, selected at the selecting;
reducing, using the processor, a number of colors in the update areas using the color map generated by performing the first generation process or the second generation process; and
transmitting, using the processor, a compressed image of update area to the terminal apparatus, wherein
the selecting includes selecting the first generation process when the number of the detected update areas is less than a threshold value, and selecting the second generation process when the number of the detected update areas is greater than or equal to the threshold value.

5. A non-transitory computer readable recoding medium having stored therein a program that causes a computer to execute a remote screen control process comprising:
rendering a process result of software on an image memory that stores a display image to be displayed on a terminal apparatus connected via a network;
detecting an update area in which an update occurs between frames of the display image;

selecting either of a first generation process that generates a color map for each update area based on colors used in an image of the update area, and a second generation process that generates a color map commonly used between the update areas based on colors used in the entire display image or an image of an area that includes all of update areas, according to a number of the detected update areas;

performing the first generation process or the second generation process, selected at the selecting;

reducing a number of colors in the update areas using the color map generated by performing the first generation process or the second generation process; and transmitting a compressed image of update area to the terminal apparatus, wherein the selecting includes selecting the first generation process when the number of the detected update areas is less than a threshold value, and selecting the second generation process when the number of the detected update areas is greater than or equal to the threshold value.

* * * * *